Sept. 22, 1936.                K. E. LYMAN                    2,055,177
                              AUTOMATIC CLUTCH
                        Filed Feb. 19, 1932           5 Sheets-Sheet 4
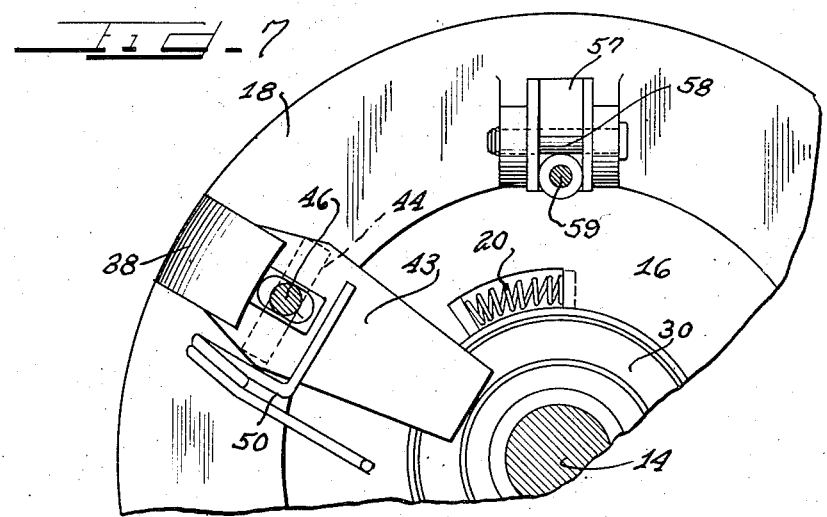
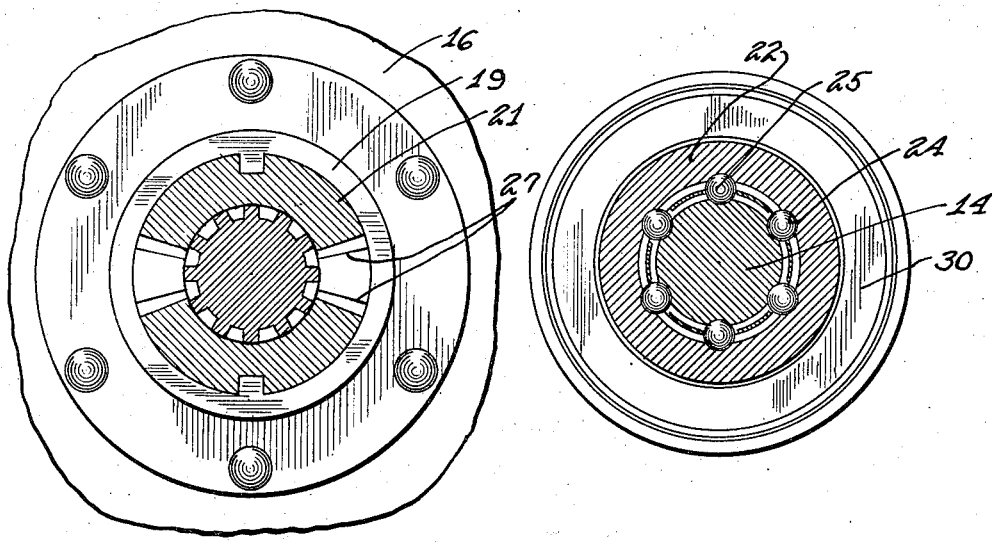
Inventor
Kenneth E. Lyman

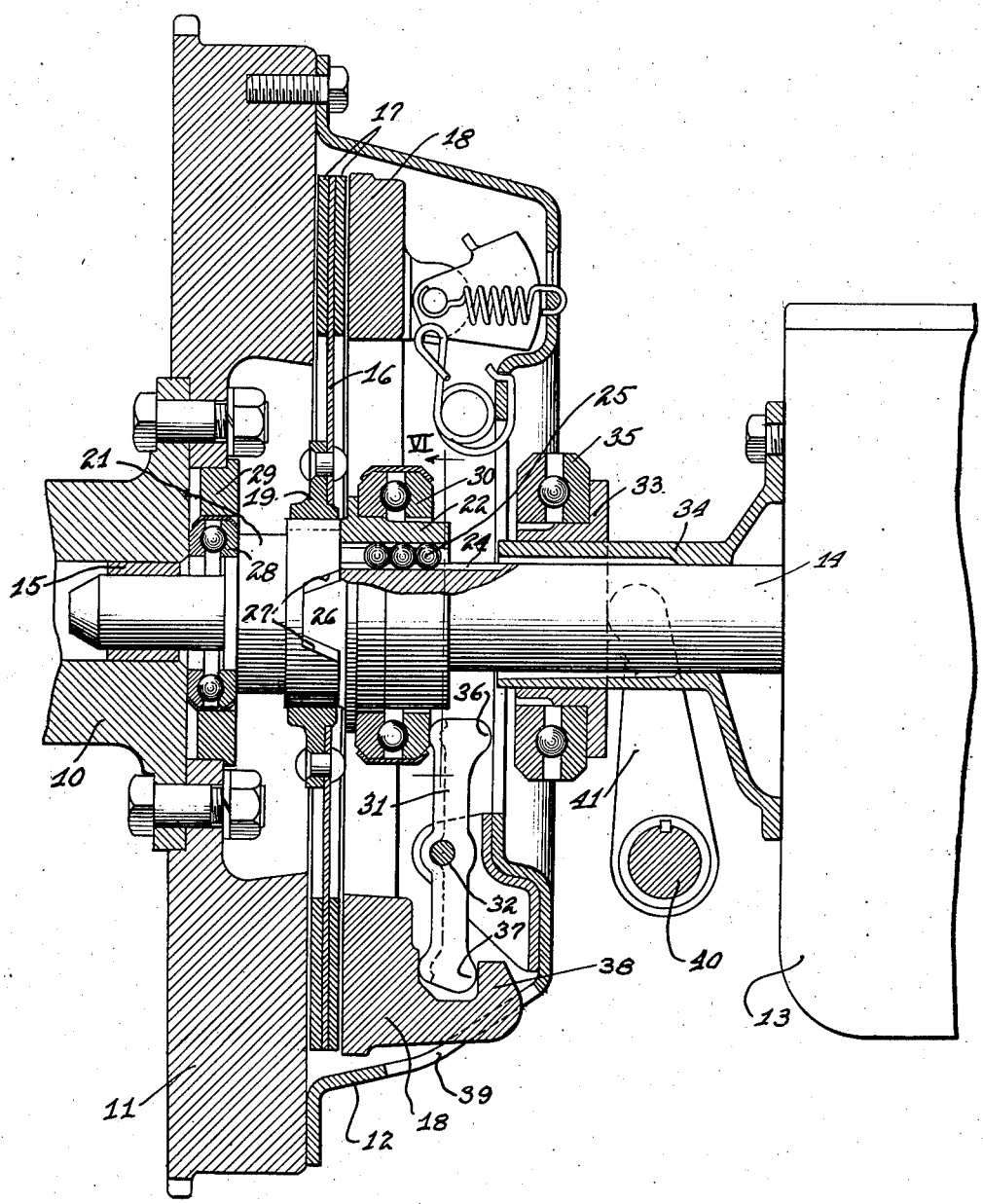

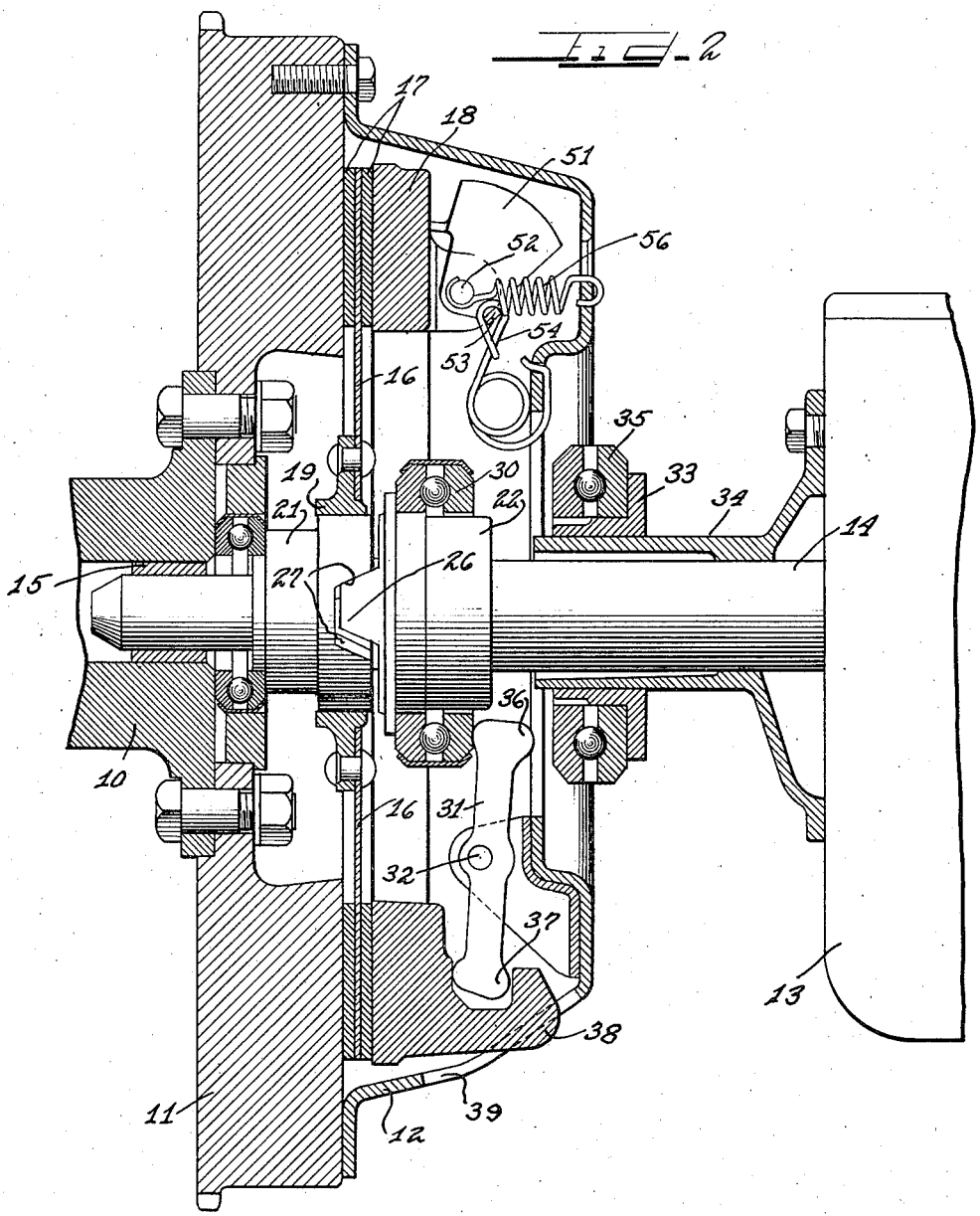

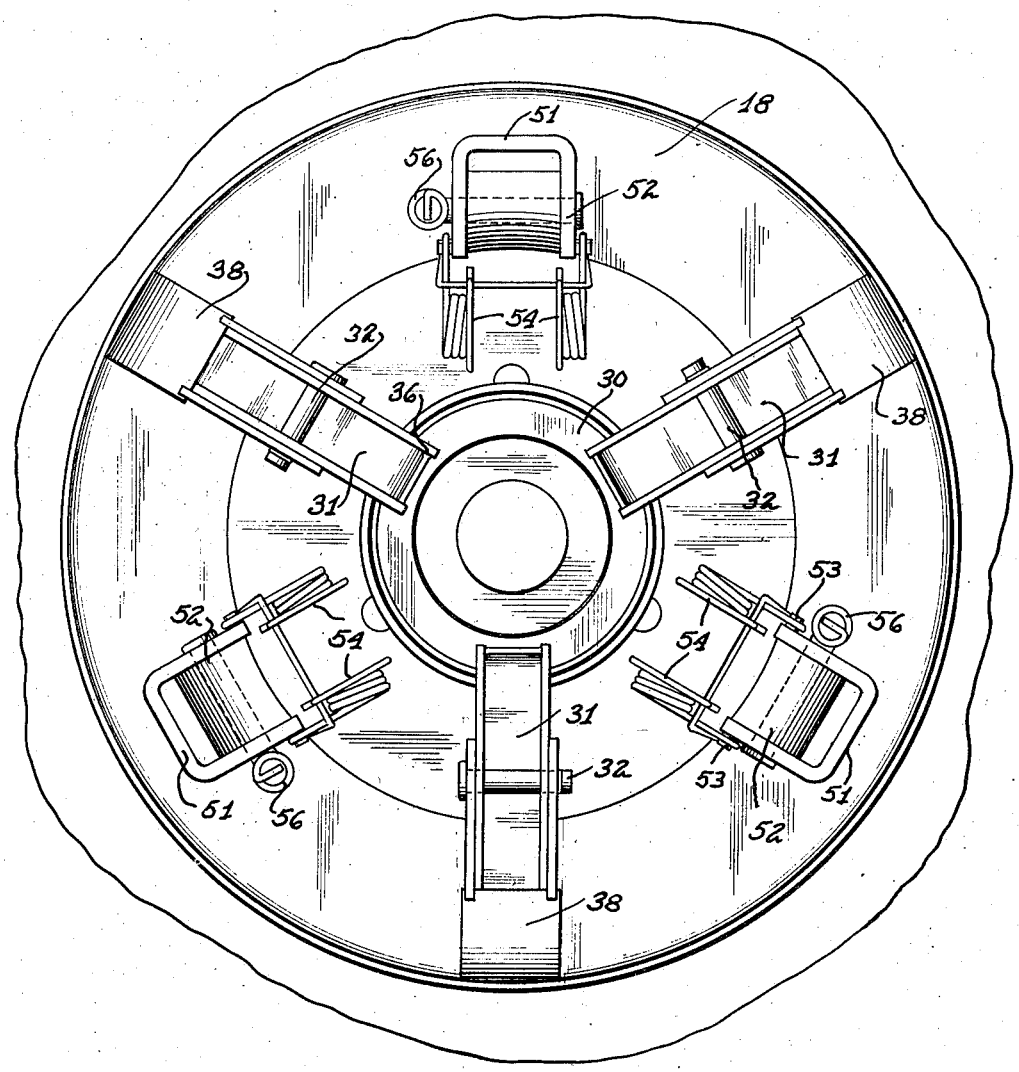

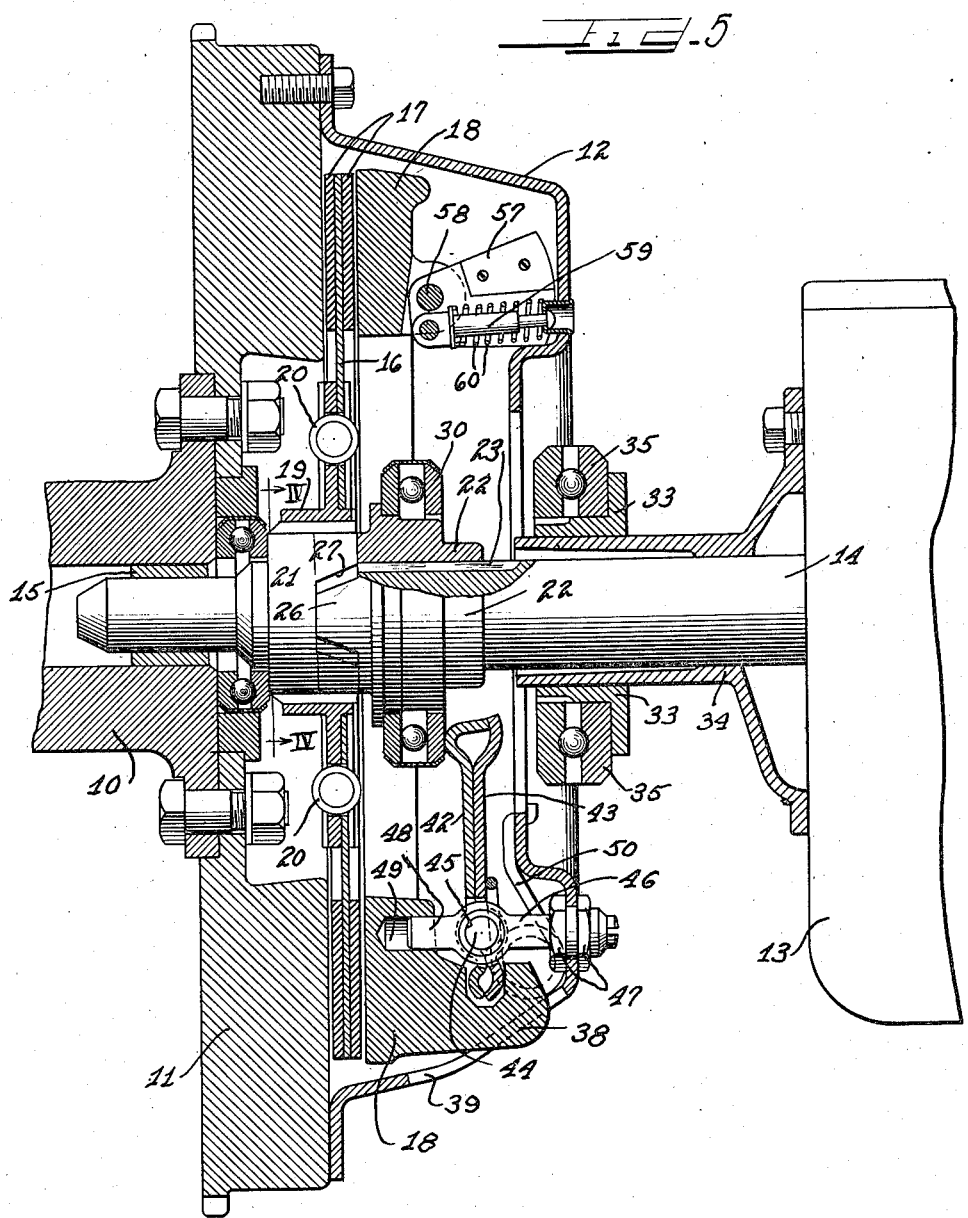

Patented Sept. 22, 1936

2,055,177

UNITED STATES PATENT OFFICE 2,055,177

AUTOMATIC CLUTCH

Kenneth E. Lyman, Rockford, Ill., assignor to Automatic Transmission Company, Rockford, Ill., a corporation of Illinois Application February 19, 1932, Serial No. 594,025

17 Claims. (Cl. 192—105)

This invention relates to automatic clutches of the centrifugal type wherein the clutch automatically engages the driven member upon the driving member reaching a predetermined speed of revolution. More specifically, the invention relates to automatic clutches interposed between the engine and transmission of an automotive vehicle, the clutch being designed to automatically disengage at engine idling speeds to both provide free wheeling and to facilitate transmission gear shifting without the use of the usual manual clutch release pedal, and to automatically re-engage upon accelerating the engine. The free wheeling feature is thus automatically provided by the clutch mechanism merely by releasing the accelerating pedal without the complication of added over-running or one-way clutches in or behind the transmission.

Centrifugal clutches of various types have been proposed heretofore but have been found unsatisfactory in service because of the variation of centrifugal force with varying engine speeds, since if a simple centrifugal clutch is designed for carrying full engine torque at speeds just above idling then the weights required will be excessive and the clutch action will be too harsh for smooth engagement when the engine is accelerated to pick up the load. It is accordingly an object of this invention to provide an improved automatic clutch overcoming the disadvantages of those heretofore proposed and to this end I provide a relatively light centrifugal mechanism to bring the clutch elements into initial contact, the torque so produced being utilized to cause further and complete engagement or pressure on the clutch elements.

It is another object of this invention to provide a relatively simple and inexpensive automatic clutch construction wherein centrifugal force is utilized to take up the normal clearances provided in the clutch elements and is supplemented by a mechanical movement energized by the torsional forces set up by the initial clutch contact thus in effect forming a self energizing clutch that builds up pressure in proportion to the load and releases upon a reversal of the drive as by a tendency for the driven elements to overrun the driving elements, thus providing free wheeling or coasting by automatically releasing the clutch.

It is a further object of this invention to provide an improved automatic clutch of the class described wherein the clutch elements are manually separable from the fully engaged position by a manual control acting to positively withdraw the clutch pressure plate.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical section along the axis of a disengaged clutch embodying the features of this invention.

Figure 2 is a section similar to Figure 1 showing the clutch in engaged position.

Figure 3 is a section on the line III—III of Figure 1 with the cover omitted.

Figure 4 is a fragmentary section on the line IV—IV of Figure 5.

Figure 5 is a section similar to Figure 1 showing a modified form of clutch operating mechanism.

Figure 6 is a fragmentary section on the line VI—VI of Figure 4.

Figure 7 is a fragmentary detail of the clutch structure of Figure 5, corresponding to the showing of Figure 3.

As shown:

The clutch chosen to illustrate the embodiments of this invention is intended to be interposed between the engine of an automotive installation, and the transmission therefor. An end of the engine crankshaft is indicated by the reference numeral 10 and carries a flywheel 11 against the rear face of which is bolted a clutch housing 12. A transmission case is indicated by the numeral 13, a transmission drive shaft 14, which forms the clutch driven shaft, and will be hereafter so referred to, extending forwardly through the clutch housing to a front pilot bearing 15 located in the hollow center of the engine crankshaft. As is usual practice a clutch disc 16 having facings 17 is engaged between the rear face of the flywheel and a pressure plate 18 within the clutch housing, the clutch disc serving to drive the driven shaft 14 when clamped between the pressure plate and the flywheel. As shown in Figure 1 the clutch disengagement is accomplished by a retraction of the pressure plate 18 sufficient to obtain running clearances on both sides of the clutch disc, these clearances being exaggerated in the drawings for the sake of clearness. The foregoing description is intended to apply to various standard types of automotive clutches whether single disc or otherwise, and if desired, also incorporating a torsionally yielding mounting of the clutch disc 16 relative to its hub 19, such as is indicated by springs 20 in Figure 5.
The present invention relates to improved and novel means for advancing and retracting the pressure plate 18 to engage or disengage the clutch and obviously may be applied to variations in the substantially standard elements described above.

In the present invention the clutch disc hub 19 is mounted on a sleeve 21 which is freely rotatable on the driven shaft 14, the clutch drive to the shaft 14 being taken through the sleeve 21 to a collar 22 longitudinally shiftable on but constrained to rotate with the shaft 14. As shown in Figure 5, this collar 22 may be splined to the shaft 14 as indicated by the numeral 23 or since it is essential that the collar be freely movable regardless of any driving load, the splines may be of special form such as shown in Figure 1, wherein a plurality of longitudinal ball races 24 are formed in both the collar and shaft and a series of balls 25 positioned therein, the balls serving as driving splines while materially reducing the friction and the possibility of freezing in the usual form of splines.

The drive from the clutch disc 16 through its hub 19 to the collar 22 is accomplished by means of interfitting teeth 26 and pockets 27, the driving and trailing faces of which are inclined as shown in order that any torque on the disc 16 will cause the tongues on the collar 22 to climb one face of the pockets thus forcing the collar 22 to the right into the position of Figure 2. A comparison of Figures 1 and 2 will make this feature clear. Since this action creates an end pressure on both the hub sleeve 21 and collar 22, the hub sleeve is provided with a thrust bearing 28 seated against the crankshaft flange and centered by a ring 29. Similarly the collar 22 is provided with a thrust bearing 30 which acts against the inner ends of pressure levers 31 fulcrumed to the housing 12 at 32. The outer ends of the levers 31 act against the pressure plate to increase the pressure and thus build up the torque on the clutch disc 16 which in turn increases the shifting movement of the collar 22 and further builds up the pressure on the clutch disc. Thus the clutch is self energizing and builds up its own pressure as long as any slippage occurs, after the clutch has been brought into light initial engagement by the centrifugal mechanism to be subsequently described, which mechanism is provided to take up the initial running clearance previously mentioned.

A manual clutch release mechanism is provided comprising a collar 33 slidable upon a sleeve 34 bolted to the transmission and providing a bearing for the shaft 14, the collar 33 carrying a thrust bearing 35 which engages an enlargement 36 on the inner ends of the pressure levers 31 when the collar 33 is shifted to the left. The outer ends of the pressure levers 31 are provided with similar enlargements 37 which engage beneath lugs 38 carried by the clutch pressure plate 18, the outer ends of these lugs extending through slots 39 in the housing 12 to maintain alignment between the pressure plate and the housing. The collar 33 corresponds to the usual throwout bearing of a manually operated clutch and is operated in the same way by a pedal controlled shaft 40 and lever 41, the movement of the collar 33 to the left engaging the pressure levers 31 and rotating them counterclockwise to move the pressure plate 18 away from the clutch disc 16.

In the modification of Figure 5 the pressure levers and mountings therefor are of modified construction embodying an adjustment for clearance due to wear of the clutch elements. In this modification the pressure lever is built up of two stampings 42 and 43 secured together and pivoted on a cross pin 44 held in an eye 45 intermediate the length of a stud 46 which is attached to the housing by nuts 47 which can be adjusted on the stud to advance the eye 45 towards the flywheel as wear occurs on the clutch facings. The other end 48 of the stud is piloted in a recess 49 in the pressure plate to give added torsional rigidity to the assembly. A torsion spring 50 is shown acting on the lever 43 to cause the same to follow the collar 22 in its release movement, and thus pull back on the pressure plate 18 to release the same. The operation of this modification is otherwise identical with that of the principal form.

The two forms of centrifugal weights shown respectively in Figures 1 and 5 are provided to take up the initial running clearance in the disengaged clutch and both forms operate in the same way although differing in the location and type of the control springs. In both forms, centrifugally responsive weights are pivoted and act to increase the pressure of lightly loaded springs, initially overbalanced by retracting springs, the initially lightly loaded springs then overcoming the retracting springs and thus pressing the pressure plate into initial engagement with the clutch disc whereupon the self energizing mechanism comes into play to build up the clutch pressure until no further slippage occurs. It will be noted that the centrifugal weights develop a predetermined relatively light spring load on the pressure plate and this spring load can be easily overcome by the manual release without necessitating the retraction of the centrifugal weights to their normal released position.

The structure shown in Figure 1 utilizes a series of sheet metal stampings for the weights 51 which are pivoted at 52 to the pressure plate 18. These weights carry offset lugs 53 which act to increase the pressure on torsion springs 54, engaged between the lugs and the housing 12, when the weights 51 pivot outwardly into the position of Figure 2, under the influence of centrifugal force at a predetermined rotative speed. The pressure plate 18 is normally retracted by coiled springs 56 engaged between the weight pivots 52 and the housing. The springs 54 and 56 are so proportioned that when the weights are in the position of Figure 1 the torsion spring 54 will have an initial load less than that of the coil spring 56 so that the latter will then retract the pressure plate. The springs are so chosen, however, that the outward swing of the weights into the position of Figure 2 will build up the spring load in the torsion spring 54 to overbalance the coil spring 56 so that the torsion spring 54 will then advance the pressure plate as shown in Figure 2 with sufficient pressure to initiate the action of the self energizing clutch engaging mechanism, as previously described.

The weight structure of Figure 5 includes a series of weights 57 pivoted at 58 to the pressure plate and having an offset engagement with a telescopic link 59 forming a guide for a coiled compression spring 60. The operation is the same as before although the springs differ in form and location, as in this form of the invention the torsion spring 50, acting on the pressure lever 43, corresponds to the pressure plate retracting coil spring 56 of Figure 1 and in the disengaged position overcomes the pressure of the compression spring 60 which corresponds to the torsion spring 54 of Figure 1. When the weights 57 fly out, the spring 60 then overbalances the spring 50 as in the first described form, thus causing the pressure plate 18 to advance into initial engagement with the clutch disc whereupon the self energizing action comes into play to build up the pressure.

While the operation of the clutch of this invention has been described in connection with each element it will be convenient to summarize the operation at this point. The centrifugal weights and the springs therefor are so proportioned as to come into action at speeds slightly above idling, so that at idling speeds the clutch is automatically disengaged and comes into action when the engine is speeded up, as is the normal practice when picking up the load after engaging the transmission gears. When the weights swing out they shift the pressure plate into an initially light contact with the clutch disc 16, the pressure being sufficient, however, to impose appreciable torque on the disc thus turning the disc and its hub relative to the collar 22 and causing the tongue 26 to climb the inclined face of its groove 27 in the disc sleeve 21. This action pushes the collar 22 to the right on the shaft 14 and thus applies further pressure to the plate 18 through the levers 31. The increased pressure on the clutch disc acts to further and smoothly build up the engaging pressure until no further slippage occurs between the disc 16 and the flywheel and pressure plate 18. Thus the pressure attained is a function of the driving torque applied to the clutch so that the clutch is capable of carrying any reasonable overload yet is not subjected to any more pressure than is necessary to carry the applied torque. An important advantage of this arrangement is that if the clutch is engaged for a light load and a heavy load is suddenly added, the clutch will momentarily yield to soften the shock, while the clutch pressure is being built up to carry the increased load.

Since the manual clutch throwout needs only to overcome the pressure differential between the opposed weight springs plus the friction between the tongue and groove of the self energizing mechanism, the position of the weights has no direct effect on the pressure required to release the clutch as this action can be taken without retracting the centrifugal weights. It will also be evident that the slightest tendency of the driven shaft to over-run the engine will release the tongue and groove, thus releasing the self energizing feature and allowing the engine to drop to idling speed and a full disengagement of the clutch if the accelerator is released.

It will thus be seen that I have invented an improved and simplified automatic clutch which is self energizing in action, and in which the engaging pressure is built up to a point where slippage stops. Further the clutch is manually disengageable regardless of the position of the centrifugal weights, and free wheeling is automatically provided as often as the drive is reversed by a tendency of the driven shaft to over-run the engine as when coasting.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A clutch mechanism comprising in combination a driving member, a driven member, clutch elements carried by each member, the driven clutch element being rotatably mounted relative to the driven member, centrifugally responsive means for initially engaging the clutch element, means rotatable with the driven member for engaging the driven clutch element, cam means interposed between said means and the driven clutch element for axially shifting the said means rotatable with the driven member, and means actuated by the axial shifting of said means to further engage the clutch elements.

2. A clutch mechanism comprising in combination a driving member, a driven member, clutch elements carried by each member, the driven clutch element being rotatably mounted relative to the driven member, centrifugally responsive means for initially engaging the clutch element, means rotatable with the driven member for engaging the driven clutch element, cam means interposed between said means and the driven clutch element for axially shifting the said means rotatable with the driven member, means actuated by the axial shifting of said means to further engage the clutch elements, and manually actuable means for reversing the axial shifting movement of said means rotatable with the driven member whereby to release said clutch at will.

3. A clutch mechanism comprising in combination a driving member, a driven member, clutch elements carried by each member, the driven clutch element being rotatably mounted relative to the driven member, centrifugally responsive means for initially engaging the clutch element, means rotatable with the driven member for engaging the driven clutch element, cam means interposed between said means and the driven clutch element for axially shifting the said means rotatable with the driven member, and means actuated by the axial shifting of said means to further engage the clutch elements, and means for manually reversing said last mentioned means whereby to release said clutch.

4. A clutch mechanism comprising a driving member, a driven member, clutch elements carried by each member, the driven clutch element having a limited rotative movement relative to the driven member, centrifugal means for bringing the clutch elements into initial engagement, cam means associated with the driven clutch element and the driven member, and pivoted pressure fingers actuated by the cam means to build up pressure between the clutch elements as long as relative movement occurs between the driven clutch element and the driven member.

5. A clutch mechanism comprising a driving member, a driven member, clutch elements carried by each member, the driven clutch element having a limited rotative movement relative to the driven member, centrifugal means for bringing the clutch elements into initial engagement, cam means associated with the driven clutch element and the driven member, pivoted pressure fingers actuated by the cam means to build up pressure between the clutch elements as long as relative movement occurs between the driven clutch element and the driven member, and manually actuable means acting through the pressure fingers for disengaging the clutch elements at will.

6. In a clutch of the class described, a driving member, a driven member, clutch members associated with each of said members, centrifugally responsive means rotating with the driving member for initially engaging the driving clutch member with the driven clutch member under a predetermined pressure, means actuated by frictional slippage between said clutch members for further increasing the pressure therebetween, whereby to provide a self energizing clutching action wherein the clutching pressure increases as slippage occurs, and manually operable means for disengaging said clutch members independent of the position of said centrifugally responsive means.

7. A clutch of the class described comprising a driven member, a clutch disc carried thereby, clutch members one of which is mounted for axial movement to frictionally engage said clutch disc, centrifugally operated means for advancing said clutch member into initial frictional engagement with the clutch disc, and means adapted to be actuated by slippage during the initial engagement for producing further axial movement of the clutch member to increase the pressure between said clutch members and the clutch disc, and manually operable means for disengaging said clutch members independent of the position of said centrifugally responsive means.

8. A clutch of the class described comprising a driven member, a clutch disc carried thereby, clutch members one of which is mounted for axial movement to frictionally engage said clutch disc, centrifugally operated means for advancing said clutch member into initial frictional engagement with the clutch disc, said clutch disc having a limited rotational movement relative to the driven member, means non-rotatably but axially movable relative to the driven member, cam means interposed therebetween, pressure levers adapted to transmit the movement of said axially movable means to the clutch members whereby to increase the clutching pressure of said clutch members.

9. A clutch of the class described comprising a driven member, a clutch disc carried thereby, clutch members one of which is mounted for axial movement to frictionally engage said clutch disc, centrifugally operated means for advancing said clutch member into initial frictional engagement with the clutch disc, said clutch disc having a limited rotational movement relative to the driven member, means non-rotatably but axially movable relative to the driven member, cam means interposed therebetween, pressure levers adapted to transmit the movement of said axially movable means to the clutch members whereby to increase the clutching pressure of said clutch members, and manually operable means for disengaging said clutch members regardless of the position of said centrifugally responsive means.

10. In a clutch including a driving member, a driven member, and frictional connecting means between said members, means for initially engaging said frictional connecting means comprising pivoted centrifugally responsive weights, retraction springs adapted to normally hold said weights inoperative, initially weaker springs acted upon by a pivotal movement of the weights to build up pressure sufficient to overcome said retractor springs at a predetermined speed of rotation of the driving member, and torque responsive means adapted to increase the friction in said frictional connecting means upon the initial engagement thereof by said centrifugally responsive means.

11. In a clutch including a driving member, a driven member, and frictional connecting means between said members, means for initially engaging said frictional connecting means comprising pivoted centrifugally responsive weights, retraction springs adapted to manually hold said weights inoperative, initially weaker springs acted upon by a pivotal movement of the weights to build up pressure sufficient to overcome said retractor springs at a predetermined speed of rotation of the driving member, torque responsive means adapted to increase the friction in said frictional connecting means upon the initial engagement thereof by said centrifugally responsive means, and means for manually retracting said torque responsive means and said springs to cause complete disengagement of said clutch members.

12. In a clutch including a driving member, a driven member, and frictional connecting means between said members, means for initially engaging said frictional connecting means comprising pivoted, centrifugally responsive weights, and two opposed sets of springs of unequal strength, one set of said springs being adapted to urge said weights to retracted position, the other set of said springs being adapted to urge said frictional connecting means to disengaged position, each of said sets of springs having an anchorage immovable axially of the clutch, said sets of springs being so arranged as to reverse their unbalanced force upon movement of said weights under centrifugal force whereby the first mentioned set of springs will move said frictional connecting means to cause initial engagement of said connecting means.

13. In a clutch including a driving member, a driven member, and frictional connecting means between said members, means for initially engaging said frictional connecting means comprising pivoted, centrifugally responsive weights, and two opposed sets of springs of unequal strength, one set of said springs being adapted to urge said weights to retracted position, the other set of said springs being adapted to urge said frictional connecting means to disengaged position, one of said sets of springs tending to expand and the other to contract, said sets of springs being so arranged as to reverse their unbalanced force upon movement of said weights under centrifugal force whereby the first mentioned set of springs will move said frictional connecting means to cause initial engagement of said connecting means, and means for manually disengaging said frictional connecting means to disconnect the clutch against the pressure of said springs.

14. A clutch comprising driving and driven friction members relatively movable into initial engagement, dominate and dominated springs each having an anchorage immovable axially of said clutch, normally exerting an unbalanced force maintaining said members out of engagement, said members being engageable by a reversal of such force, centrifugally actuable means interposed in series with said friction members and the dominated of said springs and becoming effective coincidental with a predetermined speed of the driving clutch member to increase the force of the dominated spring sufficiently to reverse such overbalanced force.

15. A clutch mechanism comprising a driving member, a driven member, clutch elements carried by each member, the driven clutch element having a limited rotative movement relative to the driven member, centrifugal means for bringing the clutch elements into initial engagement, a cam movable with said driven clutch element, and means for finally coengaging said clutch elements for vehicular drive, said coengaging means being actuated by said cam incident to movement of said cam with the driven clutch element in either direction relatively to said driven member.

16. A clutch mechanism comprising a driving member, a driven member, clutch elements carried by each member, the driven clutch element having a limited rotative movement relative to the driven member, centrifugal means for bringing the clutch elements into initial engagement, a cam movable with said driven clutch element, and means for finally co-engaging said clutch elements for vehicular drive, said co-engaging means being actuated by said cam as an incident to movement of said cam with the driven clutch element relatively to said driven member.

17. A friction clutch comprising a driven member, a driven cam having limited movement on said member, a driving cam movable on said member and actuative coincidental with a movement thereof to move the driven cam, a driven friction element in yieldable operative connection with said driving cam, a driving friction element movable into pressing engagement with the driven element to drive the latter, means for increasing the pressure between said friction elements and actuated by said driven cam incident to such limited movement thereof, and means for initially engaging said friction elements.

KENNETH E. LYMAN.